United States Patent Office 3,810,902
Patented May 14, 1974

3,810,902
O,O-DIETHYL O-(6-FLUORO-2-PYRIDYL) PHOSPHOROTHIOATE
Raymond H. Rigterink, Midland, Mich., assignor to The Dow Chemical Company, Midland, Mich.
No Drawing. Continuation of abandoned application Ser. No. 214,371, Dec. 30, 1971. This application Feb. 28, 1973, Ser. No. 336,608
Int. Cl. C07d *31/50*
U.S. Cl. 260—294.8 K                                   1 Claim

ABSTRACT OF THE DISCLOSURE

O,O - diethyl O - (6-fluoro-2-pyridyl) phosphorothioate corresponding to the formula

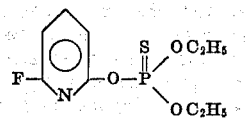

is prepared and is useful as a nematicide.

---

This is a continuation of application Ser. No. 214,371, filed Dec. 30, 1971, now abandoned.

BACKGROUND OF THE INVENTION

This invention relates to O,O-diethyl O-(6-fluoro-2-pyridyl) phosphorothioate corresponding to the formula

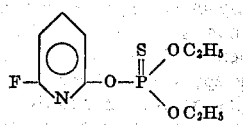

Compounds related to the above compound are taught in U.S. Pat. 3,244,586; and these compounds are taught to be useful for the control of a wide variety of pests including beetles, flies, roaches and nematodes such as root-knot nematodes. It has now been found that the above compound which has a single fluorine atom in the 6-position on the ring and which is also substituted at the 2-position on the ring with an O,O-diethyl phosphorothioate radical has exceptional activity for the control of soil-dwelling nematodes. This activity has been found to be superior to the activity of related prior art compounds which contain halogen atoms in the 6-position, halogen atoms in other positions, or no halogens. It has also been found that the compound of the present invention is less phytotoxic and is useful at much lower concentrations than the prior art compounds. This compound has excellent residual activity. This activity allows for the use of the present compound in situations where the compounds of the prior art could not be employed.

SUMMARY OF THE INVENTION

The present invention is directed to O,O-diethyl O-(6-fluoro-2-pyridyl) phosphorothioate corresponding to the formula

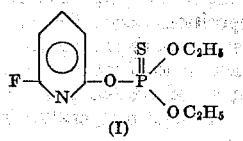

The compound of this invention is a solid or viscous liquid material which is somewhat soluble in many common organic solvents and of very low solubility in water. The compound has very low phytotoxicity to plants. This compound is especially adapted to be employed as the active toxicant in the control of soil-dwelling nematodes, such as, for example, root knot, cyst, citrus, and lesion nematodes.

The novel compound of the present invention can be prepared by several methods. In a preferred method, the compound is prepared by reacting O,O-diethyl phosphorochloridothioate with 6-fluoro-2-pyridinol.

The reaction is conventionally carried out in the presence of an acid-binding agent such as, sodium, potassium, calcium or lithium carbonate and an inert organic liquid such as, for example, dimethylformamide, carbon tetrachloride, chloroform, benzene, toluene, isobutyl methyl ketone or methylene dichloride. While the amounts of the reagents to be employed is not critical, it is preferred for highest yields, to employ substantially equimolecular proportions of the pyridinol and phosphorochloridothioate reactants. The reaction takes place smoothly at atmospheric pressure and at the temperature range of from 0° to 100° C. with the production of the desired product and chloride byproduct. In carrying out the reaction, the reactants are mixed and contacted together in any convenient fashion, and the resulting mixture maintained for a period of time in the reaction temperature range to complete the reaction. Following the completion of the reaction, the reaction mixture is washed with water and any organic reaction medium removed by fractional distillation under reduced pressure to obtain the desired product as a residue. This product can be further purified by conventional procedures such as washing with water and dilute aqueous alkali metal hydroxide, solvent extraction and recrystallization. When operating within the preferred conditions, reaction times of 1 to 10 hours are sufficient for practical completion.

DESCRIPTION OF SOME PREFERRED EMBODIMENTS

In order that the present invention may be more fully understood, the following examples are given primarily by way of illustration and should not be construed as limitations upon the overall scope of the present invention.

EXAMPLE I

O,O-diethyl O-(6-fluoro-2-pyridyl) phosphorothioate

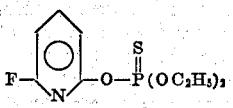

A solution was prepared containing 508.5 grams (4.5 moles) of 6-fluoro-2-pyridinol dissolved in 1800 milliliters of dimethylformamide. To this solution was added, with agitation, 477 grams (4.5 moles) of finely divided sodium carbonate. This mixture was cooled on an ice bath at 8° C. and 848 grams (4.5 moles) of O,O-diethyl phosphorochloridothioate added thereto with agitation. The resulting mixture was maintained under agitation and at a temperature of between 25°–30° C. for 4 hours. The reaction mixture was thereafter added to a mixture consisting of 6 liters of cold water and 1 liter of benzene. The resulting mixture formed two layers and these were separated in a separatory funnel. The aqueous layer, which had a pH of about 8 was extracted twice with 500 milliliter portions of benzene. All of the benzene layers were combined and washed with 500 milliliters of a 2 percent sodium hydroxide solution followed by three washings with 500 milliliter portions of water. The benzene layer was thereafter dried with a desiccant and filtered. The benzene was removed by evaporation under a pressure of 3 milliliters of mercury (mm.) and at 50° C. The crude O,O-diethyl O-(6-fluoro-2-pyridyl) phosphorothioate product which remained was recovered in a yield of 911 grams (77 percent of theoretical). Purification by distillation yielded a water-white liquid having a refractive index of $N^{25}/D=1.4953$ and a boiling point of 66° C. at 0.5 micron. The structure of the product was supported by both infra-red and nuclear magnetic resonance spectroscopy. Upon analysis, the product was found to have carbon, hydrogen and nitrogen contents of 40.32, 4.77 and 5.12 percent, respectively, as compared to the theoretical contents of 40.75, 4.94 and 5.28 percent, respectively, calculated for the above named product.

The compound of the present invention has been found to be highly effective for the control of nematodes such as root-knot nematodes, citrus nematodes, lesion nematodes and cyst nematodes.

In use, this compound is applied to area to be protected from nematodes in any of a variety of formulations and means of application. In applying the compound for nematode control, the compound is applied in an amount sufficient to exert the desired control. The required amount, however, will be governed by such variables as method of applications, area of application, time of year, temperatures, moisture, and the like. The compound of the present invention can be applied to areas to be protected from nematodes prior to crop planting and is safe to growing plants at well above the necessary use rates and can therefor be used during crop planting and also in certain standing crops.

Compositions of this invention suitable for practical use as nematicides will include the compound of Formula I, above, either alone or in admixture with other pesticides, and can include surface-active agents, inert solid or liquid diluents and other inert materials as described to produce wettable powders, suspensions, emulsifiable concentrates, dusts, solutions, granules, pellets or high-strength compositions.

In general, excellent results are obtained when the compound of the present invention is distributed through the soil in amounts of from about 0.12 to 1000 parts or more by weight per million parts by weight of soil. In field applications, the active compound may be distributed in the soil at a dosage of from about 0.1 pound to about 20 or more pounds per acre foot of soil and through a cross-section of the soil as to provide for the presence therein of a nematicidal concentration of active compound. In such application, it is desirable that the active compound be distributed to a depth of at least 12 inches below the soil surface.

The exact concentration of the compound to be employed in compositions for the treatment of growth media may vary provided nematicidal dosages of the active compound is supplied. The concentration of active compound in liquid compositions employed to supply the desired dosage generally is from about 0.01 to 50 percent by weight although as high a concentration as 90 percent by weight may be employed. In dusts, the effective weight may be from about 1 to 20 percent by weight. In compositions to be employed as concentrates, the active compound may be present in a concentration of from about 5 to 95 percent by weight.

Liquid compositions containing the desired amount of active compound may be prepared by dispersing the compound in water or an organic liquid with the aid of a suitable surface-active dispersing agent such as ionic or non-ionic emulsifying agent. The surface-active dispersing agents are generally employed in the amount of from 1 to 20 percent by weight of the combined weight of the compound and surface-active agent in the composition. Suitable organic liquid carriers include acetone, xylene, toluene, isopropanol, polyglycols, chlorinated hydrocarbons such as methylene chloride, carbon tetrachloride, chlorobenzene and the petroleum distillates such as diesel fuel, kerosene, fuel oil, naphthas, and Stoddard solvent. Among the latter, the petroleum distillates boiling almost entirely under 400° F. at atmospheric pressure and having a flash point above 80° F. are generally preferred, however, any suitable liquid carrier or combination of carriers can be employed. The aqueous compositions may contain a small amount of a water-immisible solvent whereby, the carrier comprises an aqueous emulsion, namely, a mixture of water emulsifying agent and organic liquid. In the liquid compositions, the choice of dispersing and emulsifying agent and the amount thereof employed are dictated by the nature of the composition and by the ability of the agent to facilitate the dispersion of the active compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active compound is dispersed in and on finely divided inert solids such as clay, talc, chalk, gypsum and the like. In such operations, the finely divided carrier is mechanically mixed or ground with the active compound. Similarly, dust compositions containing the active compound may be prepared from various solid surface-active dispersing agents such as bentonite, fuller's earth, attapulgite and other clays. Depending upon the proportions of ingredients, these dust compositions may be employed as concentrates and subsequently diluted with additional solid surface-active dispersing agent or with chalk, talc, diatomaceous earth or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the compound is dispersed in soil or growth media in any conventient fashion, such as, by simply mixing with the soil, by applying to the surface of the soil and thereafter dragging or disking into the soil to the desired depth, by employing a liquid carrier to accomplish the penetration and impregnation or by injection or drilling techniques whereby the toxicant is deposited beneath the surface of the soil.

In a further method, the distribution of the active compound in soil may be accomplished by introducing the toxicant in the water employed to irrigate the soil. In such procedures, the amount of water may be varied with the porosity and water-holding capacity of the soil to obtain the desired depth of distribution of the toxicant.

DESCRIPTION OF THE PREFERRED EMBODIMENTS

The following examples illustrate the methods of the present invention but are not to be construed as limiting:

EXAMPLE II

An acetone solution containing 50 grams of O,O-diethyl O-(6-fluoro-2-pyridyl) phosphorothioate, as the sole toxicant, per liter of solution was prepared and employed for the treatment of seed beds (50 grams samples) containing sandy loam soil which was heavily infested with sugar beet cysts and larvae. The soil samples were placed in a sealable container and thereafter treated with the fumigant composition. In the treating operations, separate portions of the test composition were injected into separate soil samples at rates sufficient to provide from about 5 to about 160 pounds of active toxicant per acre-foot of infected soil. The containers of treated soil were sealed and set aside in a 70° F. constant temperature room for a period of one week.

Following the latter period, the containers were unsealed, allowed to aerate under the same conditions as set forth above for an additional week and the soil thereafter planted with sugar beet seeds. Untreated check soil was also planted with sugar beet seeds. During the following growth period no adverse effects upon germination and growth of seedlings attributable to the presence of residual fumigation were observed. About three weeks after planting the plants were lifted from the soil, and the roots washed and examined for evidence of attack by nematodes. Examination of the plants indicated that the test compound gave substantially complete control of nematodes when employed at concentrations of from 5 to 160 pounds of active toxicant per acre-foot of soil. Concurrent examination of the roots of the plants grown in the untreated check soil showed dwarfing and heavy adherance of sugar beet nematodes to the roots.

EXAMPLE III

Separate aqueous compositions containing O,O-diethyl O-(6-fluoro-2-pyridyl) phosphorothioate, as the sole toxicant, were prepared for drench treatment of sandy loam soil samples infested with root knot nematodes. In such operations, a pre-determined amount of the phosphorothioate compound was dissolved in acetone and separate portions of the resulting acetone solutions were mixed with water in order to produce the desired aqueous treating compositions containing various amounts of the phosphorothioate test compound per million parts by weight of aqueous composition. The prepared aqueous compositions were added to containers of sandy loam soil in an amount sufficient to wet the soil completely. Thereafter, the treated soil samples were allowed to stand open to the air at room temperature for a period of 4 days. Following this period, cucumber seeds were planted in the treated soil samples. Checks were prepared by planting cucumber seeds in containers of the same nematode infested soil which had not been treated with the toxicant materials.

The seeded soil samples were maintained in a greenhouse under growth conducive conditions. About 1 week after planting, the plants were lifted from the treated and check soil samples and the roots were washed and examined for root knot nematode control. The percent control of root galling at the employed concentration in nematode infested soil is set forth in the following Table I.

TABLE I

| | Percent control of root galling [1] | | |
|---|---|---|---|
| Run No. | Test chemical | Concentration, p.p.m. in water | Percent [2] control |
| 1 | O,O-diethyl O-(6-fluoro-2-pyridyl) phosphorothioate | 0.8 | 66 |
| 2 | do | 1.6 | 87 |
| 3 | do | 3.2 | 100 |
| 4 | do | 6.4 | 100 |
| 5 | Solvent check (acetone) | | 0 |

[1] Percent control=Gall rating of check—Gall rating of treatment/Gall rating of check×100.
[2] Average of 5 replicates.

EXAMPLE IV

Aqueous compositions containing O,O-diethyl O-(6-fluoro-2-pyridyl) phosphorothioate as the sole toxicant were prepared and employed as drenches to treat sandy loam soil infested with sugar beet cyst and larvae. In such operations, a predetermined amount of the compound was dissolved in acetone, and separate portions of the acetone solution were mixed with water. The aqueous compositions were drenched on nematode-infested soil in separate sealable containers to give containers containing 0.4, 0.8, 1.6, 3.2, 6.4, 12.8 and 25.6 parts of toxicant per million parts of soil. The containers were sealed and set aside for 7 days at a constant temperature of 70° F.

Thereafter the containers were unsealed and sugar beet seeds were planted in each container. Untreated check soil was also planted with sugar beet seeds. The seeds were allowed to grow under greenhouse conditions for 3 weeks. Following this period, the plants were washed free of soil and the number of nematodes adhering to the plants were counted and compared with the number adhering to the check plants. The percent control of nematodes at each concentration is set forth in the following Table II.

TABLE II

| | Percent control of sugar beet nematodes | | |
|---|---|---|---|
| Run No. | Test chemical | Concentration, p.p.m. in soil | Percent [1] control |
| 1 | O,O-diethyl O-(6-fluoro-2-pyridyl) phosphorothioate | 0.4 | 87 |
| 2 | do | 0.8 | 89 |
| 3 | do | 1.6 | 92 |
| 4 | do | 3.2 | 99 |
| 5 | do | 6.4 | 99 |
| 6 | do | 12.8 | 100 |
| 7 | do | 25.6 | 100 |
| 8 | Solvent check (acetone) | | 0 |

[1] Average of three replicates.

6-fluoro pyridinol employed as a starting material can be prepared by the diazotization of 6-fluoro-2-aminopyridine in dilute sulfuric acid. Alternatively, this compound can be prepared by refluxing 2,6-difluoropyridine in aqueous sodium hydroxide for about one hour.

What is claimed is:
1. O,O - diethyl O-(6 - fluoro - 2 - pyridyl) phosphorothioate.

References Cited
UNITED STATES PATENTS
3,244,586  4/1966  Rigterink _____ 260—294.8 K
3,686,191  8/1972  Nishimura et al. __ 260—294.8 K ALAN L. ROTMAN, Primary Examiner U.S. Cl. X.R.

260—297 P; 424—263